United States Patent [19]
Lee

[11] Patent Number: 5,792,017
[45] Date of Patent: Aug. 11, 1998

[54] VIDEO CASSETTE RECORDER INCORPORATING THEREIN A BELT PULLEY SET ENABLING A TIMING BELT TO BE MOUNTED THEREOVER WITHOUT BELT SLACK

[75] Inventor: Chang-Ho Lee, Seoul, Rep. of Korea

[73] Assignee: Daewoo Electronics Co., Ltd., Seoul, Rep. of Korea

[21] Appl. No.: 616,982

[22] Filed: Mar. 18, 1996

[30] Foreign Application Priority Data

Mar. 29, 1995 [KR] Rep. of Korea .................. 95-5861

[51] Int. Cl.⁶ .......................... F16H 7/00; F16H 55/12; F16H 7/18
[52] U.S. Cl. .................. 474/148; 474/151; 474/172; 474/173; 474/273; 242/608.6
[58] Field of Search ..................... 474/144, 148, 474/151, 152, 165, 172, 173, 202, 204, 273; 242/608.6

[56] References Cited

U.S. PATENT DOCUMENTS

| | | | |
|---|---|---|---|
| 3,156,130 | 11/1964 | Gant | 474/151 |
| 4,226,381 | 10/1980 | Katata | 242/71.8 |
| 4,234,137 | 11/1980 | Watanabe et al. | 242/71.8 |
| 4,422,396 | 12/1983 | Szostak | 112/261 |
| 4,473,194 | 9/1984 | Kashimura | 242/71.8 |
| 5,320,583 | 6/1994 | van Wingen Born Looyen | 474/144 |

*Primary Examiner*—Tamara L. Graysay
*Assistant Examiner*—Gary S. Hartmann
*Attorney, Agent, or Firm*—Anderson Kill & Olick, P.C.

[57] ABSTRACT

A video cassette recorder comprises a power transfer apparatus provided with a timing belt, a capstan motor pulley and a driven belt pulley. The capstan motor pulley includes a first contact body fixed to a capstan motor shaft of a capstan motor and adapted to be contacted with the timing belt, a first fixed guide plate integrally formed on one principal plane of the first contact body facing toward the capstan motor, and a first guide cap detachably mounted on the other principal plane of the first contact body, in order to prevent the timing belt from deviating from the first contact body. The driven belt pulley has a second contact body contacted with the timing belt, a second fixed guide plate integrally formed on one principal plane of the second contact body located in a same direction as the first fixed guide plate, and a second guide cap detachably mounted on the other principal plane of the second contact body in order to prevent the timing belt from deviating from the second contact body.

1 Claim, 4 Drawing Sheets

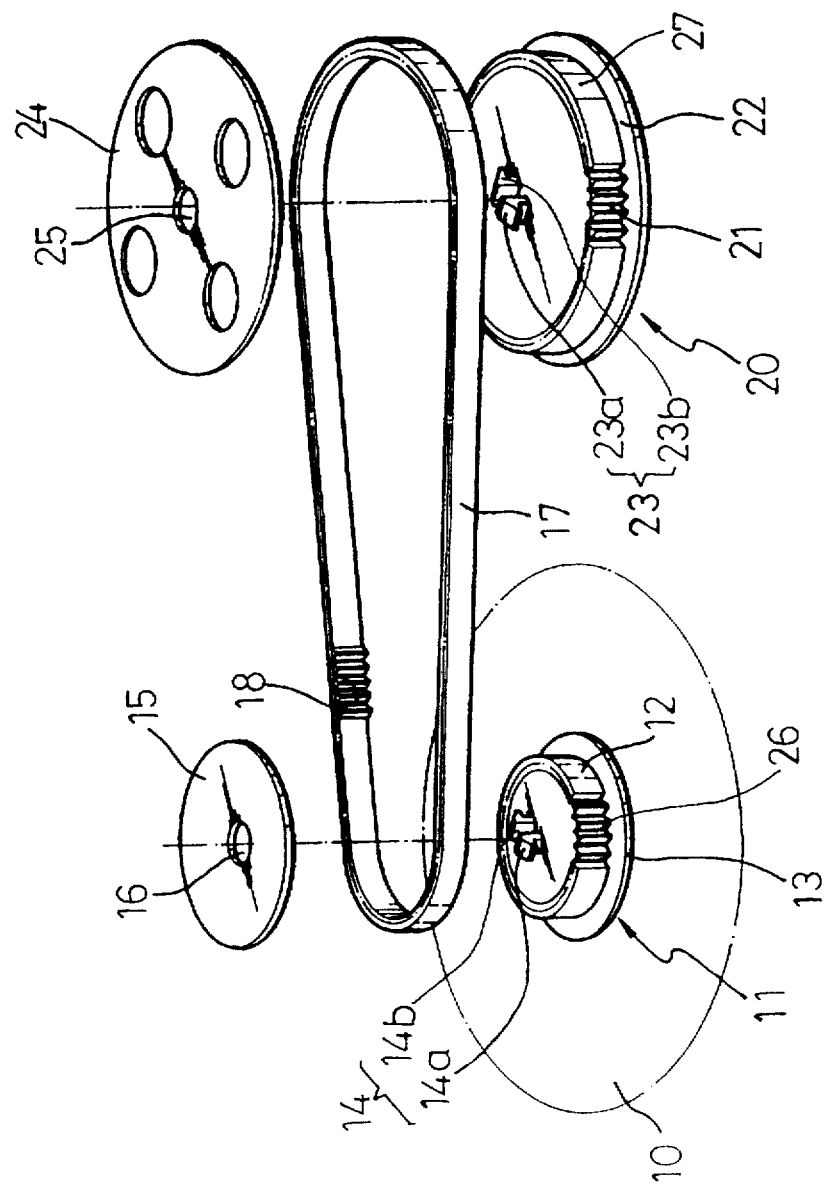

VIDEO CASSETTE RECORDER INCORPORATING THEREIN A BELT PULLEY SET ENABLING A TIMING BELT TO BE MOUNTED THEREOVER WITHOUT BELT SLACK

FIELD OF THE INVENTION

The present invention relates to a video cassette recorder (VCR); and, more particularly, to a video cassette recorder incorporating therein a belt pulley set, wherein the belt pulley set is structured in such a way that a timing belt wound therearound is prevented from slackening.

DESCRIPTION OF THE PRIOR ART

In a conventional VCR, reel devices for transporting a tape on a deck are driven by a capstan motor through a timing belt, a gear set and an idler gear. The driving power from the capstan motor is normally transferred to a driven gear by the timing belt winding around a pair of pulleys which are fixed to a capstan motor shaft and a driven gear shaft, respectively. A rotational force of the driven gear is transferred to a reel gear for rotating a reel table on which a tape pack is set.

In FIGS. 1A and 1B, there are illustrated a bottom view and a side sectional view of a power transfer mechanism of the prior art VCR, respectively. As shown in FIG. 1A, the power transfer mechanism includes a capstan belt pulley 3 fixed to a capstan shaft 2$b$, and a rotor plate 2$a$ of a capstan motor(not shown). The capstan belt pulley 3 has a first set of teeth 3$a$ on its lateral surface, and a pair of guide plates 3$b$ integrally formed on an upper and a lower parts thereof, respectively.

Through a timing belt 4 having a set of teeth 4$a$ meshable with the first set of teeth 3$a$ on the capstan motor belt pulley 3, a rotational force of the capstan motor pulley 3 is transmitted to a driven gear pulley 5. The driven gear pulley 5 also has a set of teeth 5$a$ on its lateral surface, and a pair of guide plates 5$b$ integrally formed on an upper and a lower parts thereof, respectively. The guide plate sets 3$b$ and 5$b$ in the capstan belt pulley 3 and the driven gear pulley 5 serve to prevent the timing belt 4 from deviating from an operative position thereof. For this purpose, the guide plate sets 3$b$ and 5$b$ are designed to have a larger diameter than portions of the capstan motor belt pulley 3 and the driven gear pulley 5 retaining the timing belt 4 thereon.

On the other hand, the guide plate sets 3$b$ and 5$b$, constructed in this manner, tend to cause the timing belt 4 to be slackened or loosened, when the timing belt 4 is placed around the driven gear belt pulley sets 3, 5 during the process of assembling the VCR. Namely, the timing belt 4 has to be stretched or tensioned in order to place it around the guide plate sets 3$b$ and 5$b$. For this reason, when installed around the capstan motor and the driven gear belt pulley sets 3, 5, the timing belt 4 may not have a required level of tension for transferring power.

In order to provide the slackened timing belt 4 with a proper tension, therefore, in the prior art power transfer mechanism, an adjustment bracket 8 and a roller 8$a$ supported by the adjustment bracket 8 are used. The adjustment bracket 8 is pivotable at a pin 1$a$. After the timing belt 4 is provided with the required tension by properly retaining the roller 8$a$ on the timing belt 4, the adjustment bracket 8 is fixed by a screw 8$b$.

However, such use of separate components, i.e., the roller and the bracket, for adjusting the belt tension causes the VCR to be structurally complicated, causing an increasing in the manufacturing cost thereof. Furthermore, the roller may become a source of power loss.

SUMMARY OF THE INVENTION

It is, therefore, a primary object of the invention to provide a video cassette recorder incorporating therein a belt pulley set enabling a belt to be trained therearound without being slackened or loosened.

The above and other objects of the invention are accomplished by providing a video cassette recorder incorporating therein power transfer apparatus of the type transferring a power from a capstan motor to a driven belt pulley by using a belt, wherein the apparatus comprises: a capstan motor pulley including a first contact body fixed to a capstan motor shaft of the capstan motor and adapted to be in contact with the belt, a first fixed guide plate integrally formed on one principal plane of the first contact body facing toward the capstan motor, and a first guide cap detachably mounted on the other principal plane of the first contact body by a first clamping means, in order to prevent the belt from deviating from a predetermined operating position in the first contact body; and a driven belt pulley including a second contact body contacted with the belt, a second fixed guide plate integrally formed on one principal plane of the second contact body located in a same direction as the first fixed guide plate, and a second guide cap detachably mounted on the other principal plane of the second contact body by a second clamping means, in order to prevent the belt from deviating from, a predetermined operating position in the second contact body.

BRIEF DESCRIPTION OF THE DRAWINGS

The above and other objects and features of the instant invention will become apparent from the following description of preferred embodiments taken in conjunction with the accompanying drawings, in which:

FIG. 2 illustrates an exploded perspective view of a power transfer mechanism including a capstan belt pulley and a driven belt pulley in accordance with the present invention.

DETAILED DESCRIPTION OF THE PREFERRED EMBODIMENTS

Figure 1A:
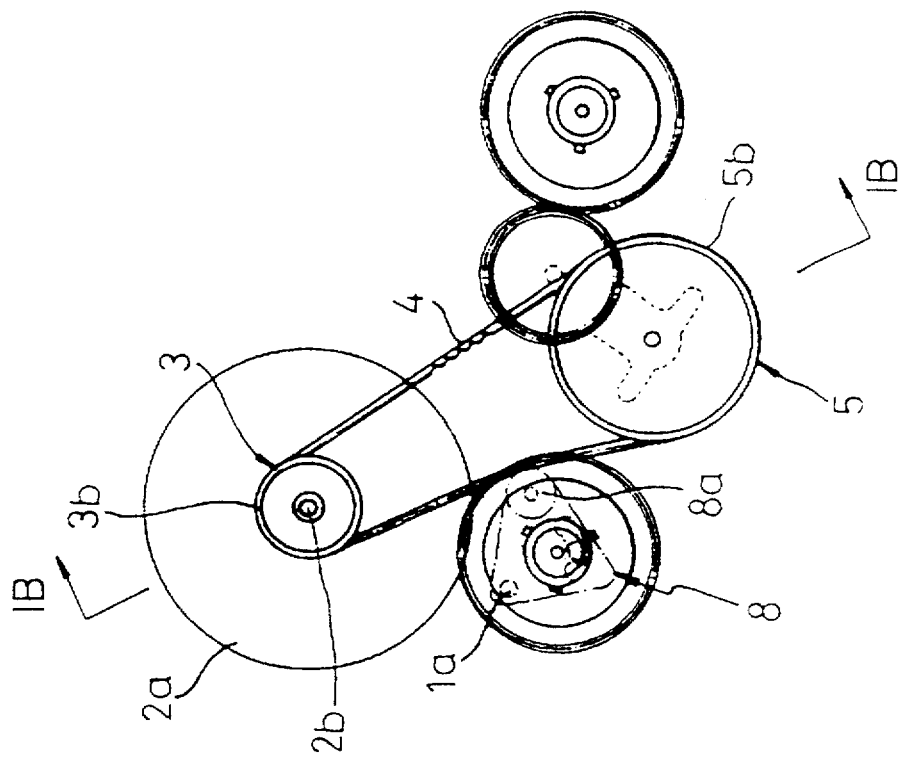
FIG. 1A shows a bottom view of a power transfer mechanism employed in the conventional VCR.
Figure 1B:
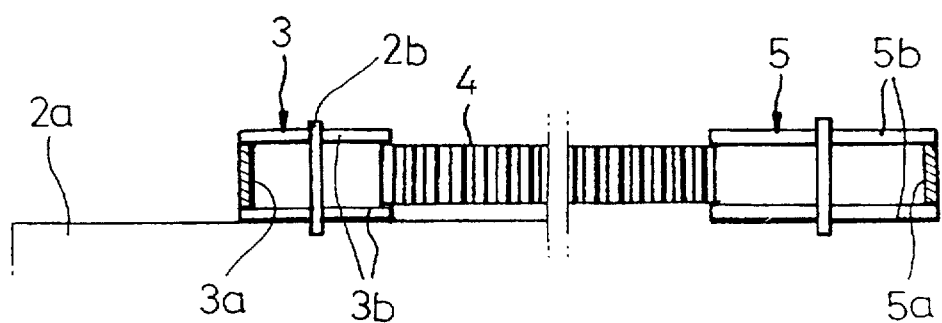
FIG. 1B represents a side sectional view taken along line B—B in FIG. 1A.
Figure 3:
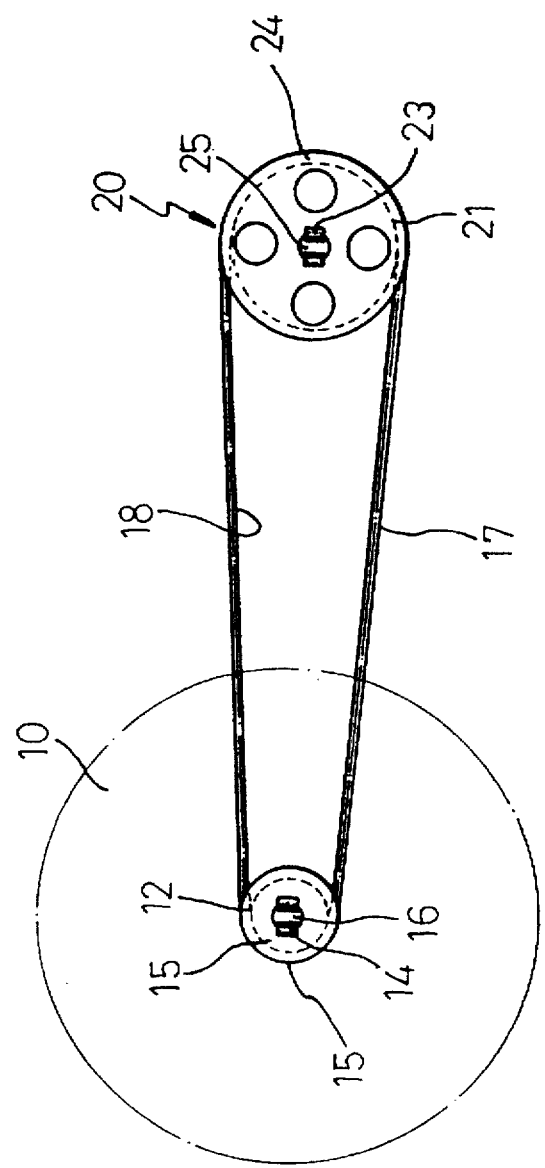
FIG. 3 presents a bottom view of the inventive power transfer mechanism including the capstan and the driven belt pulley sets.

There is shown in FIG. 2 an exploded view of a power transfer apparatus in accordance with the present invention including a capstan belt pulley 11 fixedly mounted to a capstan motor shaft(not shown) and a capstan motor rotor plate 10 positioned under the capstan belt pulley 11, a driven belt pulley 20 and a timing belt 17. The capstan belt pulley 11 is provided with a contact body 12, a fixed guide plate 13 and a guide cap 15.

Formed on a lateral external surface of the contact body 12 is a first set of teeth 26 for preventing a slippage between the timing belt 17 and the capstan belt pulley 11 to thereby transfer power from a capstan motor(not shown) at a required speed ratio to the timing belt 17. The fixed guide plate 13 is integrally formed on one principal plane of the contact body 12 which faces toward the capstan motor rotor plate 10 and a first elastic hook 14 protruding on the other principal plane of the contact body 12.

In order to prevent the timing belt 17 trained around the capstan belt pulley 11 from moving upward or downward, each of the fixed guide plate 13 and the guide cap 15 is provided with a larger diameter than that of the contact body 12. The elastic hook 14 has a pair of folded posts 14a and 14b spaced apart and facing each other. The guide cap 15 is secured to the contact body 12 by inserting the elastic hook 14 into a through-hole 16 of the guide cap 15 and then widening it.

On the other hand, the first set of teeth 26 on the capstan motor pulley 11 is constructed to mesh with a set of teeth 18 formed on the timing belt 17.

A rotational force of the capstan motor pulley 11 is transferred to the driven belt pulley 20 through the timing belt 17. The driven belt pulley 20 also includes a contact body 27, a fixed guide plate 22 and a guide cap 24. The contact body 27 of the driven belt pulley 20 has a set of teeth 21 meshable with the set of teeth 18 on the timing belt 17 on its lateral external surface.

The fixed guide plate 22 is integrally formed on one principal plane of the second contact body 27, the principal plane of the contact body 27 being on a same plane as that of the principal plane of the capstan motor pulley 11 provided with the fixed guide plate 13, while the guide cap 24 is detachably mounted on the other principal plane of the driven belt pulley 20. Each of the fixed guide plate 22 and the guide cap 24 has a larger diameter than that of the contact body 27 containing the timing belt 17 in order to prevent the timing belt 17 from deviating from a proper operative position on the contact body 27. A second elastic hook 23 having a pair of folded posts 23a and 23b extends from the principal plane of the contact body 27 having the guide cap 24; and the guide cap 24 is secured to the contact body 27 in a similar manner as the guide cap 15 of the contact body 12.

That is, the second elastic hook 23 is inserted into a through-hole 25 and then widened.

In the inventive power transfer apparatus constructed in this manner, the belt pulleys 11 and 20 enable the timing belt 17 to be placed therearound without slackening the timing belt 17 during the mounting operation by first removing the guide caps 15, placing the timing belt 17 and then mounting the guide caps 15, 16.

Although the invention has been shown and described with respect to the preferred embodiments, it will be understood by those skilled in the art that various changes and modifications may be made without departing from the spirit and scope of the invention as defined in the following claims.

What is claimed is:

1. In an improved video cassette recorder incorporating therein a power transfer apparatus of the type transferring power from a capstan motor to a driven belt pulley by using a belt, the improvements comprising:

a capstan motor pulley including a first contact body fixed to a capstan motor shaft of the capstan motor and adapted to be in contact with the belt, a first fixed guide plate integrally formed on one principal plane of the first contact body facing toward the capstan motor, a first detachable guide cap having a first through-hole formed therethrough and fixed on another principal plane of the first contact body by using a pair of first folded posts perpendicularly extending from another principal plane in such a manner that the pair of first folded posts are first inserted through the first through-hole and then widened; and a driven belt pulley including a second contact body adapted to be in contact with the belt, a second fixed guide plate integrally formed on one principal plane of the second contact body located in a same direction as the first fixed guide plate, and a second detachable guide cap having a second through-hole formed therethrough and fixed on another principal plane of the second contact body by using a pair of second folded posts perpendicularly extending from the other principal plane in such a manner that the pair of second folded posts are first inserted through the second through-hole and then widened, wherein the first and the second fixed guide plates and the first and the second guide caps have larger diameters than those of the first and the second contact bodies, respectively.

* * * * *